Oct. 25, 1966  C. J. KOESTER  3,281,712
MODE-SELECTIVE Q-SWITCHING LASER STRUCTURE
Filed July 27, 1962  3 Sheets-Sheet 1

INVENTOR.
Charles J. Koester
BY
John A. Harvey
Attorney

Oct. 25, 1966  C. J. KOESTER  3,281,712
MODE-SELECTIVE Q-SWITCHING LASER STRUCTURE
Filed July 27, 1962  3 Sheets-Sheet 2

INVENTOR.
Charles J. Koester
BY John A. Harvey
Attorney

Oct. 25, 1966  C. J. KOESTER  3,281,712
MODE-SELECTIVE Q-SWITCHING LASER STRUCTURE
Filed July 27, 1962  3 Sheets-Sheet 3
FIG. 8
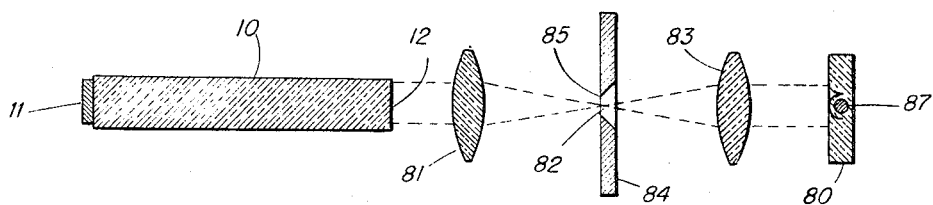
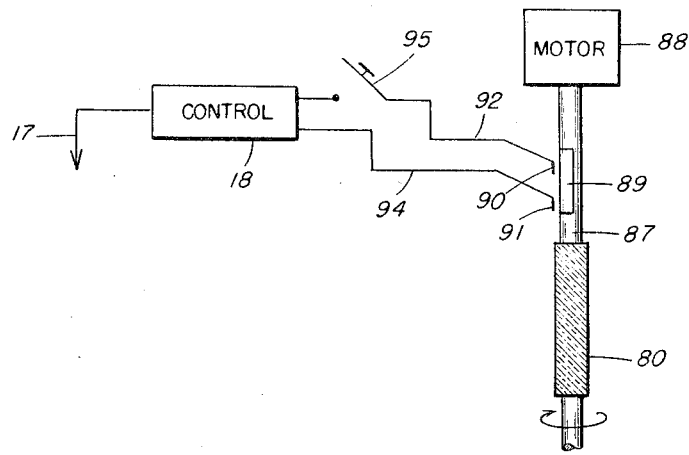
FIG. 9
INVENTOR.
Charles J. Koester
BY John A. Harvey
Attorney 3,281,712
MODE-SELECTIVE Q-SWITCHING LASER STRUCTURE
Charles J. Koester, South Woodstock, Conn., assignor to American Optical Company, Southbridge, Mass., a voluntary association of Massachusetts
Filed July 27, 1962, Ser. No. 212,989
24 Claims. (Cl. 331—94.5)

This invention relates to lasers, and particularly to so-called resonant laser structures wherein the ratio of wave energy storage to wave energy dissipation per wave-energy cycle is rapidly shiftable from a low value to a high value at a predetermined finite time after the laser material in the structure has been energized to establish a laserable inversion of energy states thereof. In a more particular sense, the invention relates to improvements in such systems, said improvements employing the principle of mode selection to provide a laser output of desirably superior intensity.

Lasers, sometimes referred to as optical masers, are light-amplifying devices and are specifically adapted to produce high-intensity pulses of coherent, monochromatic light concentrated in an extremely narrow beam. They find use in diverse fields as sources of such light energy, being employed, for example, in arts wherein it is desired to deliver light energy in intense and highly concentrated form to a relatively small target area.

Light is produced in a laser by photonic emission from the active atoms of a body composed of a so-called laser material. This emission occurs incident to the transition of the atoms from an excited, high energy level to a lower energy level. Accordingly, laser operation essentially involves exciting active atoms in the laser body to such high energy level, and inducing the emissive transition of the excited atoms in a manner controlled to utilize the light thereby emitted to provide the desired laser output pulse. The nature and number of interlevel transitions which must be effected in a complete atomic cycle of laser operation are dependent on the properties of the particular laser material used.

By way of example, one conventional form of laser structure includes a rod-shaped body composed of a suitable solid laser material, such as synthetic crystalline ruby, surrounded concentrically by a helical gaseous discharge tube (commonly called a flash tube), which is adapted to emit a pulse of light specifically including light in the wavelength of an absorption band of the laser material. When the flash tube is actuated, this light pulse enters the transmissive laser body, pumping the body with energy of such wavelength. This pumping excites active atoms in the laser body to shift from an initial low energy level in a series of interlevel transitions, typically involving a first energy-absorptive transition to a very unstable high energy level and an immediately subsequent spontaneous transition (with release of heat energy but presently regarded as non-emissive) from this unstable level to the somewhat more stable high energy level referred to above (intermediate in energy between the aforementioned initial and unstable levels) and from which light-emissive transition occurs. Thus the pumping pulse provides the excitation step in laser operation, creating a very large population of atoms at the higher energy level in the laser body. The establishment of this large high-level population is referred to as an inversion of energy states of the body.

For effecting induced light-emissive transition from this level to complete the atomic cycle of laser operation, the laser body of the structure is disposed coaxially within a resonant cavity defined between opposed internally reflective cavity ends. Immediately upon the inversion of energy states of the body, individual atoms at the aforementioned high-energy level begin to undergo emissive transition spontaneously, shifting to a terminal low energy level (which may or may not be the initial low energy level, depending on the nature of the laser material used) with concomitant emission of light. Since this high energy level is relatively stable in a laser material, such spontaneous emission would deplete the enlarged high level population at a comparatively slow rate. However, a portion of the light emitted by the spontaneously emitting atoms passes through the resonant cavity to the ends thereof, and is thence reflected back and forth through the cavity between the reflective cavity ends, passing and repassing in multiple bidirectional reflections. This bidirectional reflected light immediately excites other atoms at the high energy level in such manner as to induce them to undergo emissive transition to the terminal level, producing more light, most of which augments the bidirectionally reflected light in the cavity to induce still further emissive transitions from the high level population. In such fashion, a rising pulse of bidirectionally reflected light quickly develops within the cavity, reaching a quantitatively large value as the induced emissive transition of atoms from the high level population becomes massive. Light of high intensity is accordingly created in one or a succession of light pulses while the pumping light is present, the action continuing until depletion of this population by such transitions restores the laser body to a normal energy state. To permit emission of a portion of the large bidirectionally reflected light pulse or pulses from the laser cavity, one reflective end of the cavity is made partially transmissive. The fraction of the bidirectionally reflected light escaping therethrough constitutes the laser output pulse.

In laser operation of the foregoing character, the energy-pumping pulse is of finite duration. Excitation of atoms to the high energy level occurs throughout this finite pumping period. However, with a laser cavity maintained internally reflective at both ends, light emitted by spontaneous emission from atoms in the high level population begins to reflect back and forth in the cavity and in so doing to induce emmissive transitions of other high level atoms in significant number (initiating the laser output pulse), at a so-called threshold point which is reached substantially before the end of the pumping period. Thus for a considerable portion of the pumping period, the effect of the pumping pulse in augmenting the high level population is offset by the depletion of the latter population due to such induced transitions, with the result that the magnitude of the high-level population levels off prematurely at a plateau instead of continuing to increase as would otherwise be possible in the absence of induced emission.

As therefore appears, the same pumping pulse could create a significantly larger maximum high-level population in the laser body if the transition-inducing state created by multiple light reflections could be retarded until a later time in the pumping period. Such delay of the latter state would be desirable, because the magnitude of the peak power attained by the laser output pulse is directly related to the magnitude of this maximum high-level population, and it is often regarded as very desirable to obtain as large a peak power output as possible for optimum laser utility. In other words, the prevention of premature bidirectional light reflections, thereby allowing development of a larger high level population, would enable attainment of a peak power output advantageously greater than that produced with the threshold laser operation described above.

It has been found that the multiple bidirectional reflections of spontaneously emitted light can be delayed in the desired manner by a technique hereinafter referred to as Q switching. The Q, or quality factor, of the laser resonant cavity is proportional to the ratio of wave energy storage to wave energy dissipation per wave cycle therein. When one end of the cavity-providing structure is nonreflective, the resultant structure is said to be in a low Q condition because light emitted by spontaneous transition of high level atoms in the laser body cannot reflect back and forth in multiple reflections through the structure, but is instead dissipated at the nonreflective end after at most two passes through the structure. In this condition, therefore, bidirectional light reflections cannot build up to induce emissive transition of high level atoms in significant number. Q switching operation involves maintaining the cavity-providing structure in a low Q condition during that portion of the pumping pulse required for the high level population to reach a maximum value (which is substantially larger than the plateau value attained in threshold laser operation). Then, at a time approximating this moment of maximum inversion, the previously nonreflective end of the cavity structure is caused to become reflective, switching the structure to a so-called high Q condition. Multiple bidirectional reflection of light produced by spontaneous emission in the laser body begins immediately upon such switching, and quickly rises by induced emission from atoms in the very large high-level population previously established. The resultant laser output pulse is much faster in rise time, and very desirably higher in peak power, than the pulse produced in threshold laser operation.

The intensity of the useful portion of the laser output pulse can also be increased by restricting the bidirectional reflection of light in the laser cavity to light emitted in certain selected modes of propagation. The atoms in a laser body emit light in a plurality of such modes, including the mode for the plane wave propagated parallel to the long axis of the body, herein designated the plane wave front mode, and modes for waves propagating at angles to this axis, herein referred to as spurious modes. If the only light allowed to reflect back and forth through the cavity were light emitted in the plane wave front mode, so as to effect stimulation of emission predominantly by mode-selected plane wave light-energy, a high degree of emissive efficiency would be achieved. The laser output of light in the plane wave front would be significantly greater than it is when bidirectional reflection of light in spurious modes is permitted to develop in the cavity, and the beam spread angle of the output pulse would be correspondingly reduced; as a result, the intensity of the output, or power per unit area delivered by the laser at any given distance (an inverse function of the beam spread angle), would be advantageously increased. Thus to the extent that bidirectional reflection of light emitted in the spurious modes is inhibited, the emissive efficiency of the laser will be desirably improved.

It has been found that mode selection can be effected in a laser structure of the type described by maintaining the cavity in low Q condition for light emitted in the spurious modes throughout laser operation, and providing high Q condition primarily restricted to the plane wave front mode. With mode selection of this character, waves propagating at angles to the long axis of the laser body are dissipated rather than reflected through the cavity. Thereby bidirectional reflection of light emitted in the spurious modes is largely prevented. In consequence, the above-described mode selection provides a laser output pulse of superior intensity, with a narrowed beam spread and enhanced marshalling of the emitted light in the plane wave front.

An object of the present invention is to provide a new and improved laser structure adapted to produce an output light pulse of advantageously superior peak power per unit area.

Another object is to provide a laser structure of such new and improved character, adapted both to enable a high degree of inversion to be attained before the initiation of induced emission, and to effect stimulation of such emission predominantly by mode-selected plane wave light energy.

Yet another object is to provide a laser structure combining mode-selective and Q switching features in a novel and advantageous manner to produce output pulses of superior peak intensity.

A further object is to provide a new and improved laser structure wherein mode-selective and Q switching features interact to produce output light pulses of very fast rise time and short duration.

Further objects and advantages of the invention will be apparent from the detailed description hereinbelow set forth, together with the accompanying drawings, wherein:

FIG. 8 is a diagrammatic view of a further embodiment of the invention; and

FIG. 9 is a schematic view illustrating further structures associated with the embodiment of FIG. 8.

Figure 1:
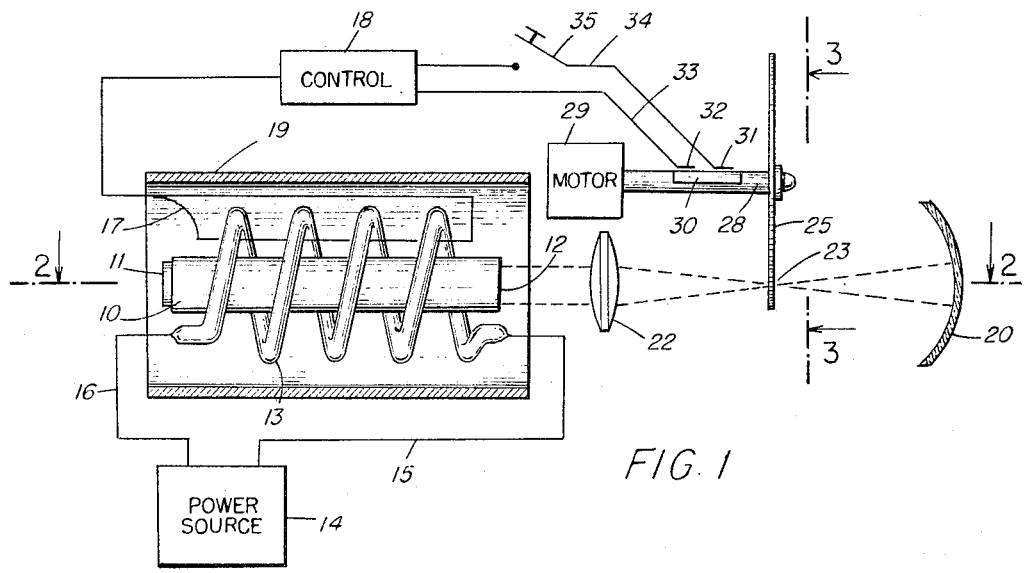
FIG. 1 is a schematic view of one embodiment of the invention.
Figure 2:
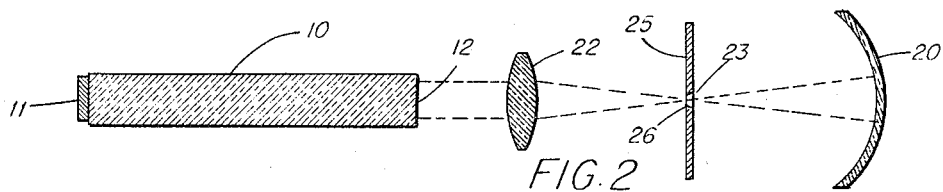
FIG. 2 is a simplified diagrammatic view taken along the plane 2—2 of FIG. 1.
Figure 3:
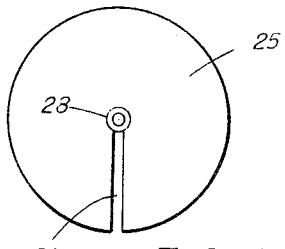
FIG. 3 is a simplified view taken along the plane 3—3 of FIG. 1.

Referring first to FIG. 1, and for certain details to FIGS. 2 and 3, the structure of the invention in the embodiment there illustrated includes, as an active laser component, a cylindrical rod-shaped body 10 of solid laser material (such as synthetic crystalline ruby) having opposed, plane, parallel end faces perpendicular to its long axis. One end face of the body is silvered, as indicated at 11, to make it internally reflective. The other end face 12 is nonreflective or transmissive, as are the side walls of the body.

A source of pumping light energy for the rod 10 is provided by a helical flash tube 13 disposed to surround the rod concentrically for substantially the entire rod length but in spaced relation to the side walls of the rod. This flash tube functions on the gaseous discharge principle, and is specifically adapted to emit pulses of light including light in the wavelength of an absorption band of the laser material. It is powered from an appropriate power source 14, of conventional design and including a high-voltage source of electric current and capacitors for energy storage, which are connected through leads 15, 16 to the opposite end electrodes of the tube. Typically, such a power source for a laser system flash tube may be adapted to provide an input to the flash tube of about 2500 joules, at a voltage between about 2.5 and about 4.5 kv.

The pulse producing discharge in the flash tube is initiated by means of a trigger circuit 17, shown as encircling the turns of the helical flash tube in proximity thereto and powered from a suitable control instrumentality indicated at 18. The character and arrangement of these elements is such that with sufficient charge energy developed in the power source 14, an electrical pulse passed through the trigger circuit 17 by the control instrumentality 18 will cause such pulse-producing discharge in the flash tube, and thus produce an input of pumping light energy to the laser rod at a time controlled by the instrumentality 18.

The laser rod 10 and flash tube 13 are surrounded concentrically by an open-ended hollow cylindrical member 19 having a reflective inner surface, to concentrate the pumping light emitted by the flash tube on the rod 10. In addition, to protect the silvered surface of the rod end face 11 from being impacted by light emitted from the flash tube, a protective cap (not shown) may be provided for this end face of the laser rod.

With the elements described above, an inversion of energy states of the laser rod 10 is effected by developing sufficient charge energy in the power source 14 for the desired gaseous discharge in the flash tube, and then passing an electric pulse from the control instrumentality 18 through the trigger circuit 17 to initiate such discharge. Thereby a pulse of light, including light of the requisite pumping wavelengths, is produced by the flash tube. The light energy of this pulse passes into the rod 10 through the transmissive side walls thereof, pumping energy of absorptive wavelength into the rod. Photons of this pumping energy are absorbed by active atoms in the rod to cause them to shift from an initial low energy level to a very unstable high energy level; these atoms at once shift again, in a spontaneous transition, to the relatively stable high energy level from which emissive transition occurs. In this manner the pumping pulse from the flash tube effects the establishment of a very large population of atoms at the latter level in the laser rod.

The rod 10 is adapted to constitute the first segment of a resonant cavity or wave energy propagation path extending from the reflective rod end face 11 (which provides the first terminus of the cavity) coaxially through the rod and beyond the transmissive end face 12 to a concave spherical mirror 20 disposed externally of the rod in coaxial relation thereto so as to reflect light toward the end face 12. A positive convex lens 22 is also included in the cavity-providing structure, disposed intermediate the rod end face 12 and the mirror 20 in fixed coaxial relation thereto.

These cavity elements are mutually arranged and adapted to permit bidirectional reflection of light in selected modes of propagation between the reflective rod end face 11 and the spherical mirror 20 through a focal point 23 in the cavity, intermediate the lens and mirror. Thus, light emitted in the rod and emerging from the end face 12 in waves propagated substantially parallel to the rod axis is focused by the lens 22 through the point 23 intermediate the lens and mirror 20. The location and configuration of the mirror are chosen so that light deverging from the point 23 to the mirror is reflected by the mirror back through the point 23 to the lens, which collimates it for re-entry into the rod end face 12 parallel to the axis of the rod. Thence passing through the rod, the light reflects off the plane perpendicular reflective end face 11 back through the rod to the lens and thence through the focal point 23 to the mirror 20, developing as multiple bidirectional reflections of light passing and repassing through the focal point 23.

The structure of the invention as shown further includes a shutter 25, comprising a plane opaque member having a surface of minimal reflectivity and an aperture or slit. The plane opaque member is disposed to occlude the focal point 23 to prevent bidirectional reflection of light therethrough, and is rapidly shiftable into and out of a position in which the aperture or slit coincides with the focal point, permitting such bidirectional reflection. When the aperture is in the latter position, it cooperates with the aforementioned lens and mirror arrangement to provide mode selection in the cavity, as hereinafter more fully explained. This shutter is illustrated as an opaque disc mounted on a shaft 28, which is driven by a suitable motor 29 to effect rotation of the shutter in a plane perpendicular to the axis of the resonant cavity at the focal point 23. The shutter is so disposed as to intersect this focal point 23 continuously during such rotation. The shutter structure includes an aperture, which may be a radial slit or a circular pin-hole aperture depending on the type of mode selection desired; this aperture is shown for convenience as a radial slit 26, which passes the focal point 23 once during each complete shutter revolution.

Except when the slit 26 thus passes the focal point, the shutter completely occludes the focal point in such manner as to prevent light in any mode from passing through the focal point between the lens 22 and mirror 20. Since the shutter is opaque and essentially nonreflective, light passing to the focal point from the end face 12 is not reflected back toward that end face, but is absorbed or otherwise dissipated at the shutter surface. Thus a so-called low Q condition obtains for all modes in the cavity-providing structure, and bidirectional reflection of light cannot develop therein. When rotation of the shutter carries the slit 26 into coincidence with the focal point 23, however, light in modes for waves focused by the lens 22 substantially through the focal point can pass freely through the focal point between the lens and mirror, and multiple bidirectional reflections of light in these modes can accordingly develop in the cavity so that the cavity is in high Q condition for these modes as long as the slit 26 remains in register with the focal point. This bidirectional light propagation in the cavity is predominantly restricted to light in these modes, other light being removed from the cavity by the combined action of the lens, the mirror, and the slit-providing shutter (which occludes light emitted in modes for waves not directed through the slit 26).

The rotation of the shutter 25 therefore effects Q switching action in the laser structure, shifting the cavity-providing structure from a low Q condition to a high Q condition as it carries the slit 26 into position coincident with the focal point 23 in the course of each cycle of shutter rotation. This rotation is synchronized with the initiation of the pumping light pulse by the flash tube so that the Q switching action occurs at a predetermined finite time after the pumping pulse is initiated. As an example of means suitable to provide such synchronized operation, there is shown a contact plate 30 mounted on the shaft 28 in appropriate angular relation to the slit 26 of the shutter 25, and contact points 31, 32 disposed to come into contact with the plate 30 simultaneously when the plate is brought into position for such contact by the rotation of the shaft. These points 31, 32 are connected to the control instrumentality 18 through leads 33, 34. A manually operable push switch 35 is mounted in series with the points 31, 32.

When the switch 35 is closed, contact of the points 31, 32 with the plate 30 completes a circuit in the instrumentality 18, actuating the latter instrumentality to energize the trigger circuit 17 and thereby to initiate the pumping light-producing gaseous discharge in the flash tube 13. The plate 30 is positioned on the shaft 28 in such angular relation to the shutter slit 26 that it comes in contact with the points 31, 32 when the slit 26 is at a preselected angular position away from coincidence with the focal point 23. Thus the pumping light pulse from the flash tube 13 is initiated at a point in the cycle of shutter rotation when the focal point 23 is completely occluded by the shutter body so that the cavity-providing structure is in a low Q condition. With the shaft 28 and shutter 25 driven at a constant predetermined angular velocity by the motor 29, the shutter slit 26 is carried into coincidence with the focal point 23 (and thereafter out of such coincidence), switching the cavity from low Q to a high Q condition (and thereafter back to a low Q condition), at a predetermined finite time after the initiation of pumping. The length of the interval elapsing between pumping initiation and switching of the cavity to a high Q condition is determined by the angular relation between the plate 30 and shutter slit 26, and the angular velocity at which the motor 29 drives the shaft 28.

The operation of the above-described structure will now be readily understood. When the requisite charge energy has been developed in the power source 14 and the motor 29 is driving the shaft 28 at a predetermined angular velocity, the switch 35 is closed. As a result, the next time thereafter that the rotation of the shaft carries the plate 30 into contact with the points 31, 32, a circuit is completed in the control instrumentality 18. Immediately the trigger circuit 17 is energized, initiating gaseous discharge in the flash tube 13; the resultant pulse of light from the flash tube serves to pump light energy into the laser rod 10 and thereby to effect establishment of a very large high-level population of atoms in the rod, in the manner previously described. Because the plate 30 and shutter slit 26 are in the above-described angular relation, the cavity-providing structure is maintained in a low Q condition during the initial portion of the pumping period. Light emitted in the laser rod by spontaneous transition of atoms of the enlarging high level population cannot reflect back and forth through the cavity structure, and therefore cannot induce emissive transitions of other atoms from the high-level population in significant number. As a result, the high-level population is not prematurely depleted during this low Q portion of the pumping period, but is enabled to increase far beyond the threshold point.

At a predetermined time after energization of the trigger circuit 17, the shutter slit 26 is carried into coincidence with the focal point 23, shifting the cavity structure from the low Q condition to a high Q condition for the aforementioned selected modes. The time relation between energization of the trigger circuit 17 and rotation of the slit 26 into position coinciding with the focal point (determined by the angular relation of the plate 30 and slit 26, and the angular velocity at which the shutter is rotated) is preselected such that this Q switching occurs at a chosen moment in the pumping period after the inversion of energy states in the laser rod has reached a maximum value.

As soon as the shutter slit thus begins to scan the focal point, light emitted in the selected modes by spontaneous transition of high level atoms in the laser rod begins to reflect back and forth in multiple passes through the cavity between the rod end face 11 and the mirror 20 through the focal point, causing progressive induced transitions of atoms from the greatly enlarged high level population, with the result that a fast-rising pulse of bidirectionally reflecting light provided by such massive induced emissive transitions develops in the cavity. Since the cooperation of the lens 22, mirror 20, and slit-providing shutter 25 permits bidirectional reflection of light in the cavity primarily only in modes for waves focused substantially through the focal point 23, development of this bidirectional reflection is principally restricted to light in such modes, and the emissive transition of other atoms from the high-level population is induced predominantly by such light. A portion of this bidirectionally reflecting light is emitted from one end of the cavity (for example, through the rod end face 11, if that end face is partially transmitting) to provide the laser output light pulse. The continuing rotation of the shutter carries the slit 26 rapidly through and beyond the position in which it coincides with the focal point 23; as it passes out of this position, the cavity-providing structure reverts to a low Q condition for all modes, terminating the bidirectional reflection and light output. After this output pulse is ended, another pumping light pulse may be initiated (by again closing the switch 35) to start another such cycle of laser operation as soon as sufficient charge energy has been again developed in the power source 14.

It will be understood that the switch 35 is a manually operated push switch of conventional character, which is manually closed to initiate energization of the trigger circuit 17 and opens when manually released a short time thereafter. Before it thus returns to open position the shaft 28 and shutter 25 may accomplish several revolutions. During each such revolution, the plate 30 is brought into contacting relation with points 31, 32. However, after the first, pulse-producing revolution following closing of the switch 35, such closing of the circuit of points 31, 32 cannot initiate a new pumping light pulse from the flash tube 13 since a significant interval is required for sufficient charge energy again to be developed in the power source 14. The switch 35 is manually released before such charge energy development occurs; accordingly, each closing of the switch 35 results in a single pumping light pulse from the flash tube. The continuing rotation of the shaft 28 during and after the time when the switch is closed also carries the shutter slit 26 into high Q-providing coincidence with the focal point 23 once during each revolution. But since the induced emission occurring during the high Q portion of the initial, pulse-producing shutter revolution (following closing of the switch 35) restores the laser rod to a substantially stable energy state, no significant buildup of induced emission can result from the subsequent high Q periods until after another pumping light pulse is produce in the flash tube, and thus each closing of the switch 35 results in a single laser output pulse.

The present structure provides an output light pulse of advantageously high peak intensity and narrow beam spread due to the cooperative effect of the Q switching operation and mode selection achieved therein. By permitting the degree of inversion of the laser rod to develop to a high maximum value (far beyond the threshold point) during the pumping period, the synchronized Q switching in the structure produces a peak power light output of desirably large magnitude. The mode selection effected by the cooperation of the lens, mirror, and slit-providing shutter contributes to the emissive efficiency of the laser structure, and in particular, by restricting bidirectional reflection of light in the cavity (when the latter is switched to a high Q condition) primarily to light in modes for waves focused substantially through the focal point 23, enables attainment of a narrowed beam spread and consequent high intensity or power per unit solid angle in the laser output light pulse. Thus in combination these effects result in a light output of advantageously high peak power per unit solid angle.

It will be understood that the time intervals referred to in the above discussion of laser operation are extremely brief. Thus, a typical flash tube pulse of pumping light may endure for approximately .001 second. The motor 29 might, for example, be powered to drive the shutter at an angular velocity of 30 revolutions per second, so that the shutter would accomplish a single revolution in approximately .033 second. The duration of the laser output light pulse will be only a small fraction of this revolution time; specifically, the duration of the output pulse is determined by the width of the shutter slit 26, the rate of shutter rotation, and the area of the image formed at the focal point 23 (which is a function of the beam spread of the emitted light emerging through the rod end 12, and the focal length of the lens 22).

Figure 4:
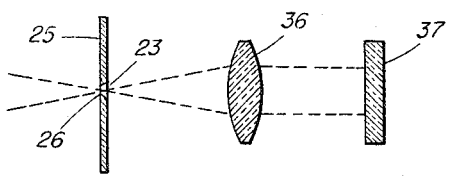
FIG. 4 is a diagrammatic view of certain alternative structures that may be employed in the embodiment of FIG. 1.

The illustrated elements of the above-described cavity-providing structure may be replaced by optical equivalents without effecting the function of the structure. Thus, for example, the optically equivalent combination of elements shown in FIG. 4 may be substituted for the concave mirror 20. In the arrangement of FIG. 4, light in the selected modes, divergng from the focal point 23, is collimated by a positive convex lens 36 and reflected off a plane mirror 37 back to the lens 36, which refocuses it through the focal point 23. Light in the selected modes therefore reflects bidirectionally through the point 23 as it does when the concave mirror is employed, and the lens and mirror arrangement of FIG. 4 has the same effect (in cooperation with the slit-providing shutter 25 and the lens 22) as the concave mirror 20 in preventing light in other modes from bidirectional reflective propagation within the cavity thus to provide the desired modes selective properties in the cavity-providing structure.

Figure 5:
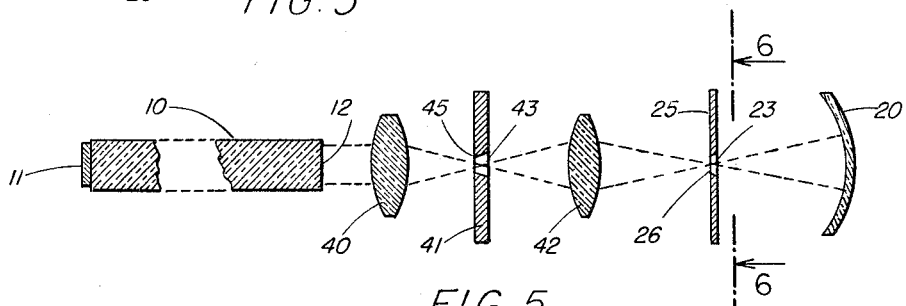
FIG. 5 is a diagrammatic view of another embodiment of the invention.

An alternative and in some respects particularly advantageous embodiment of the invention, especially from the standpoint of mode selection and rapidity of Q switching, is illustrated in FIG. 5, wherein identically numbered elements are similar to corresponding parts in FIG. 2, and wherein other parts or details (not here shown) may be, unless otherwise stated, as illustrated or described in connection with the embodiment shown in FIGS. 1–3. Thus the structure of FIG. 5 includes a laser rod 10 having a reflective end face 11 and a non-reflective, transmissive end face 12 constituting the first segment of a laser cavity extending from the reflective end face 11 coaxially through and beyond the rod 10 to a concave spherical mirror 20 disposed in fixed relation to the rod end face 12 to reflect light toward the latter end face. Light reflects back and forth in the cavity through a focal point 23, as before, intermediate the rod and the mirror 20, and a rotating shutter 25 having an opening or slit 26 is provided to occlude the focal point 23. For provision of pumping energy to the rod 10, a flash tube and associated power source and control instrumentalities identical in arrangement and function with the corresponding structures and instrumentalities illustrated in FIG. 1 may conveniently be employed; similarly, the structure of FIG. 5 may further conveniently include shutter drive and synchronizaton instrumentalities identical with those of FIG. 1. Accordingly, separate description or illustration of such features is not here necessary.

It will further be understood that with the exceptions hereinafter noted the functioning of the laser structure of FIG. 5 is essentially that described above in connection with the embodiment of FIG. 1. Thus, the initiation of a pulse of pumping light energy from the flash tube is sychronized with the rotation of the shutter 25 in such manner that the shutter occludes the focal point 23 during the first part of the pumping period and until the degree of inversion in the laser rod reaches a maximum; rotation of the shutter then causes the slit 26 to scan the focal point 23, permitting bidirectional reflection of light to develop in the resonant cavity to produce a high intensity output light pulse.

In place of the lens 22, however, the embodiment of FIG. 5 includes a lens 40, an aperture-defining structure or mask 41, and a second lens 42, disposed in the laser cavity in successive fixed spaced relation, coaxial with the rod 10, between the rod end face 12 and the focal point 23. Light in selected modes (predominantly the plane wave front mode) emitted from the laser rod through the end face 12 is directed by the lens 40 through a focal point 43 to the lens 42, which directs the light through the focal point 23 to the mirror 20. This light is reflected from the mirror 20 back through the focal point 23 to the lens 42, and thence through the focal point 43 to the lens 40, where it is collimated for reentry into the laser rod through the end face 12 parallel to the rod axis. The focal point 43 between lenses 40 and 42 coincides with an aperture 45 defined by the mask 41. Thus light in the selected modes reflects back and forth between the reflective rod end face 11 and the mirror 20 through the focal point 43 and through the aperture 45 at that point, as well as through the focal point 23.

As will be understood, the lens 40 forms an image, at the focal point 43, of configuration and dimension dependent on the homogeneity of the laser material in the rod 10 and the degree to which the rod has been pumped. The aperture 45 is proportioned so as to be smaller by a selected amount than this image, the exact aperture dimensions chosen for a particular application being determined by the desired angular spread of the output beam. The mask 41 is adapted to absorb or otherwise dissipate light striking its surface. Thus bidirectional reflection through the focal point 43 can occur only in modes directing light through the aperture 45, the other portion of the image formed by the lens 40 at the focal point 43 being blocked by the mask 41. In addition, at least a portion of the light energy passing from the lens 40 through the aperture 45 but through focal points not coinciding with the cavity axis will be reflected back by the mirror 20 in such manner as to be occluded by the mask 41. To the extent that light energy in modes for waves passing through off-axis focal points is thus occluded, the Q of the resonant structure will be reduced for those modes. The overall extent of selection against undesired modes will of course also depend upon the focal length of the positive lenses used.

Consequently, when the shutter slit 26 scans the focal point 23 laser action will take place only in those modes which send light bidirectionally through the aperture 45, as stated above. By properly dimensioning the aperture 45, an extremely high degree of mode selection can be achieved. Light emitted in the undesired spurious modes (including light in such modes refracted by the lens 40 through the peripheral portion of the image formed at the point 43) is positively occluded from bidirectional reflection through the cavity by the mask 41. In this way, the desired condition of bidirectional reflection restricted to light emitted in the plane wave front mode can be approached, with resultant increase in emissive efficiency, narrowed output beam, and augmented output light intensity.

The inclusion of the foregoing elements in the embodiment of FIG. 5 can also serve to provide particularly rapid Q switching. Specifically, this result can be achieved by making the shutter opening or slit 26 and the aperture 45 of like configuration, each with straight, parallel side edges, and by positioning the aperture 45 so that its side edges are parallel to the side edges of the slit 26 when the latter is in position scanning the focal point 23. Since only light passing through the aperture 45 is imaged by the lens 42, the image formed at the focal point 23 is straight-sided, with edges parallel to the edges of the shutter slit 26 when the latter is in position scanning the focal point 23. Obviously the shutter slit will come into register with this straight-sided image considerably more rapidly than with a circular image, with the aforementioned consequence of extremely rapid Q switching. In addition, because the cross-sectional area of the light propagation path at the focal point 23 is restricted to the very small area of this straight-sided image, only a very small angular displacement of the shutter 25 is required to shift the shutter slit 26 from a position just outside the propagation path (at which position the cavity-providing structure is still in low Q condition) to a high Q-providing position coincident with this image, a further factor contributing to the rapidity of Q switching. Similarly, the duration of the high Q condition in the cavity and thus of the laser output light pulse is very short: because of the small cross-sectional area of the propagation path at the focal point 23, the shutter slit 26 is carried through and beyond it very quickly.

The embodiment of FIG. 5 can be modified to provide a laser structure which will produce a train of short output light pulses. To this end, the shutter 25 may be replaced with a disc-shaped shutter structure 46 as shown in enlarged fragmentary schematic view in FIG. 6, positioned at the focal point 23 perpendicular to the axis of the cavity and providing a plurality of apertures spaced evenly around the periphery of the shutter disc. These apertures are shown as elongated slits 47 of identical dimension disposed in axially radial, evenly spaced arrangement completey around the periphery of the disc.

As the shutter rotates, it brings the apertures on the shutter 46 successively into register with the straight-sided image formed by the aperture 45 and lens 42 at the focal point 23. Bidirectional reflection of light through the cavity then occurs, in those modes which send light through the aforementioned aperture 45, producing the desired train or series of output light pulses.

In other words, with pumping illumination for the laser rod 10 provided by a pulse from the flash tube 13 shown in FIG. 1, rotation of the shutter 46 will carry at least several of the slits 47 successively into and out of register with the image at the focal point 23 during the pumping period. When the shutter body occludes this focal point, a low Q condition obtains in the cavity-providing structure enabling the pumping light to increase the high-level population in the rod 10. Each time one of the slits 47 comes into register with the image at the focal point 23, the cavity is shifted to a high Q condition; bidirectional light reflection can then develop therein, producing a laser output light pulse and concomitantly depleting the high-level population in the rod. As the slit is carried out of register with the image at the focal point 23, this focal point is occluded once more, terminating the bidirectional reflection and light output and permitting the high-level population to build up again in the laser rod until the next shutter slit 47 is carried into register with the image at the focal point 23. A train of successive output pulses is thus produced, continuing during that portion of the pumping period in which the pumping light is sufficient to restore the requisite inversion of energy states in the laser rod in the intervals when the shutter body occludes the focal point 23.

Figure 6:
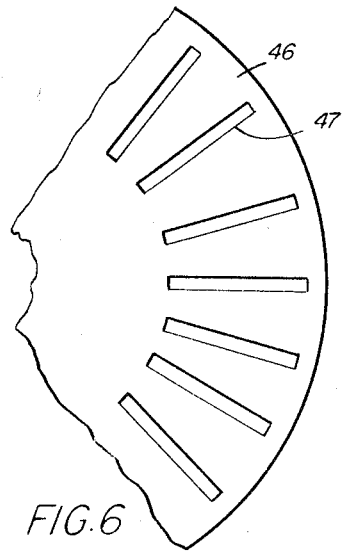
FIG. 6 is an enlarged view of a modified shutter structure for use with the embodiment of FIG. 5, taken as along the plane 6—6 of FIG. 5.
Figure 6A:
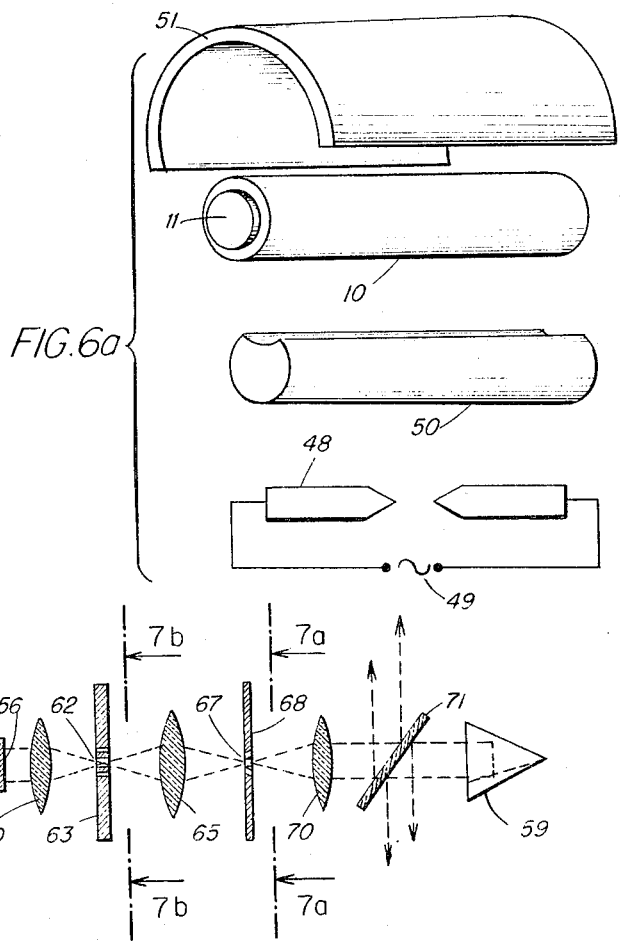
FIG. 6a is a schematic view of an alternative arrangement for pumping illumination of the laser rod of FIG. 5, for use with the embodiment of FIG. 5 as modified to include the shutter structure of FIG. 6.

In another modification of the embodiment of FIG. 5 employing the shutter structure of FIG. 6, the pulsed pumping light source or flash tube 13 and associated power source, control, and synchronization instrumentalities (shown in FIG. 1 and as indicated above included in the embodiment of FIG. 5) are replaced with a suitable continuous source of pumping illumination for the laser rod 10. This continuous pumping light source is shown in FIG. 6a as a high-intensity arc light 48 energized from a power source 49. The light emitted by the arc light 48 is concentrated by a conventional cylindrical lens 50 on the side wall of the laser rod 10. The hollow cylindrical reflector 19 of FIG. 1 is replaced by a semicylindrical member 51 having a reflective concave surface and positioned on the side of the rod 10 opposite the arc light 48 to further concentrate the light energy (emitted by the arc light 48) on the rod 10.

The arc light 48 provides continuous pumping illumination for the rod 10 during laser operation. Thus, each time the shutter body occludes the focal point 23 so that a low Q condition obtains in the cavity-providing structure, this pumping light will cause the high-level population in the rod 10 to increase. Each time one of the slits 47 is carried into coincidence with the image at the focal point 23, switching the cavity to a high Q condition, bidirectional reflection develops in the cavity to produce a laser output light pulse. In such manner, continuous pulsed laser operation is achieved, producing a succession of laser output light pulses continuing for so long as the arc light 48 is powered to provide the requisite pumping light energy for the rod 10. It will of course be appreciated that alternative sources of continuous pumping illumination may also be used to provide such continuous pulsed laser operation.

Figure 7:
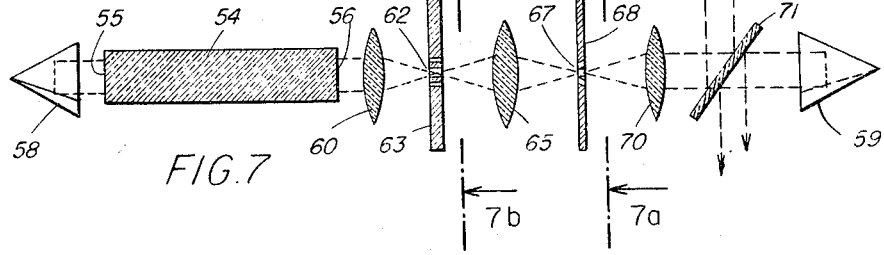
FIG. 7 is a diagrammatic view of an additional embodiment of the invention.

A further embodiment of the invention, which is of special advantage in providing extremely rapid Q switching, is illustrated in FIG. 7. The structure there shown includes a laser rod 54, similar in character and configuration to the laser rod 10 of FIG. 1 but having opposed, plane, parallel end faces 55, 56 both of which are non-reflective and light-transmissive. This rod is disposed coaxially within a resonant laser cavity having opposed internally reflective ends provided by so-called corner cubes 58, 59.

As shown, the corner cubes 58, 59 are open-ended pyramidal-shaped structures formed by the intersection of three reflective surfaces each perpendicular to the adjacent surfaces (having the configuration of the corner of a hollow cube), and are positioned at the ends of the cavity coaxially therewith and respectively opening toward the rod 54. Light passing through the cavity to an inner surface of one of these corner cubes is reflected to the adjacent inner surfaces and thence back through the cavity. In providing reflection of such character, the corner cubes have a mode-selective effect; they might if desired be substituted in the laser structures of FIGS. 1 and 5 in place of the reflective coating of the rod end face 11 or the mirror 20 or both as reflective cavity ends, for enhanced mode selection in these structures. However, the use of a corner cube to provide at least one reflective cavity end is of particular importance in the embodiment of FIG. 7.

The structure of FIG. 7 further includes a positive convex lens 60 disposed in the cavity coaxially therewith intermediate the rod end face 56 and the corner cube 59 and adapted to focus light emerging from the end face 56 through a focal point 62. An apertured mask 63 is positioned at the focal point 62 perpendicular to the cavity axis. There is also included a second lens 65 disposed in the cavity coaxially therewith and adapted to focus light, diverging from the focal point 62, through a second focal point 67. An apertured disc-shaped shutter structure 68 is positioned to intersect the focal point 67. A third positive convex lens 70 is also disposed in the cavity coaxially therewith, between the focal point 67 and the corner cube 59, to collimate light diverging from the latter focal point for passage to the corner cube parallel to the cavity axis.

This arrangement of lens 60, mask 63, lens 65, and shutter 68 in the structure of FIG. 7 is similar to the arrangement of lens 40, mask 41, lens 42, and shutter 25 in the structure of FIG. 5, with the lens 70 and corner cube 59 substituted for the mirror 20 of FIG. 5. Thus, as in the structure of FIG. 5, light is focused bidirectionally through the focal points 62 and 67, and reflects back and forth in the cavity, passing and repassing through these focal points. Also as in the structure of FIG. 5, the shutter 68 is mounted for rotation about an axis parallel to the cavity axis in such manner as to intersect the focal point 67 continuously. In addition, shutter drive, pumping light-source, power source, cylindrical reflector, control and synchronization instrumentalities identical in structure, arrangement and function with those of FIG. 1 may conveniently be employed to complete the laser structure of FIG. 7; accordingly, no separate illustration or description of such features as included in the structure of FIG. 7 is necessary.

To provide an output of light from the structure of FIG. 7, there is included a plane glass member 71 interposed between the collimating lens 70 and the corner cube 59 at a 45° angle to the cavity axis. When the cavity is in high Q condition, bidirectionally reflecting light will pass through this member 71 between the lens 70 and corner cube 59; however, a portion of such bidirectionally reflecting light will be reflected out of the cavity by the member 71, to constitute the laser output pulse.

Figure 7A:
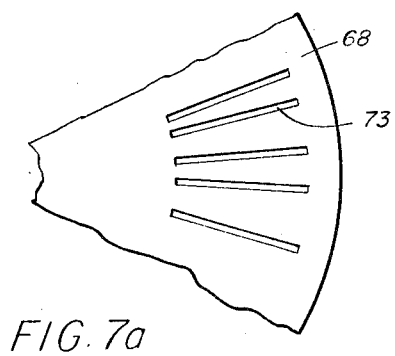
FIG. 7a is an enlarged view of the shutter structure included in the embodiment of FIG. 7, taken along the plane 7a—7a of FIG. 7.

In the structure of FIG. 7, the shutter 68 is a plane, opaque disc similar to the shutter 25 of FIGS. 1 and 5, having an apertured portion of restricted angular dimension, broadly corresponding (in angular position) to the slit 26 of the shutter 25. However, in place of the single slit 26, the apertured portion of the shutter 68 defines a plurality of very narrow slits 73 disposed in randomly spaced, axially radial arrangement on the shutter disc, as shown in enlarged schematic view in FIG. 7a. Corresponding slits 74 in an identical pattern are provided in the mask 63, as shown in enlarged schematic view in FIG.

Figure 7B:
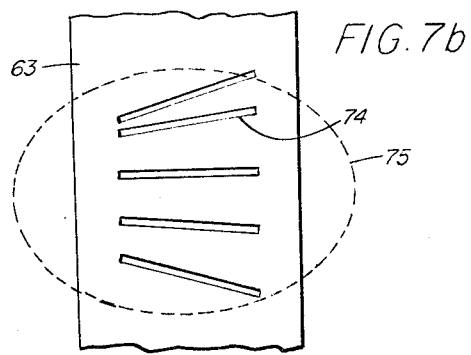
FIG. 7b is an enlarged view of the mask structure included in the embodiment of FIG. 7, taken along the plane 7b—7b of FIG. 7.

7b. The distance between the outer edges of the outermost of the slits 74 in the mask 63 is less than the diameter of the image formed by the lens 60 at the focal point 62 (as indicated in FIG. 7b, wherein the image is represented by a dotted line 75), so that when light passes through the apertures defined by the mask 63, a series of randomly spaced images is formed by the lens 65 at the focal point 67, corresponding in configuration to the apertures illustrated in FIG. 7b.

With this arrangement of apertures, rotation of the shutter 68 during laser operation carries individual shutter slits successively into and out of register with individual images at the focal point 67, producing a series of short output light pulses, and then brings all the shutter slits simultaneously into register with all the images, switching the Q of the cavity to a maximum value and producing a large output light pulse (of peak power approximately equal to the arithmetic product of the peak power attained in any one of the aforementioned short pulses multiplied by the number of slits). Immediately before this Q maximization is effected, all the shutter slits are adjacent the corresponding images at the focal point 67, but none of the slits is conjugate to any of these images, so that the cavity structure is in a low Q condition. Switching from this condition to the condition of maximum Q is thus effected by a very small angular displacement of the shutter corresponding to the width of one of the narrow slits. Because such small angular displacement is involved in Q switching, due to the arrangement and dimension of the slits, the desirably great rapidity of Q switching referred to above is achieved.

A further embodiment of the invention is illustrated in FIG. 8. As in FIG. 5, identically numbered elements of FIG. 8 are similar to corresponding parts in FIGS. 1 and 2. Thus there is shown, as before, a laser rod 10 having a reflective end face 11 and a non-reflective transmissive end face 12. With this rod there may conveniently be employed, for provision of pumping energy, a flash tube and associated power source and control instrumentalities identical with those illustrated in FIG. 1, both in arrangement and function; accordingly, illustration of such features is unnecessary.

In the embodiment of FIG. 8, the rod 10 constitutes the first segment of a laser cavity extending from the reflective rod end face 11 coaxially through and beyond the rod to an external plane mirror 80. Fixedly disposed in the cavity coaxially with the laser rod, and intermediate the end face 12 and the mirror 80, are a positive convex lens 81 adapted to focus light through a focal point 82 intermediate the lens 81 and mirror 80 and a second positive convex lens 83 positioned intermediate the focal point 82 and the mirror. There is also included a mask 84 defining an aperture 85, fixedly positioned in the cavity perpendicular to the cavity axis at the focal point 82 with the aperture 85 coincident with this aperture 85 coincident with this focal point. These elements are so arranged and adapted that light emitted from the laser rod through the end face 12 is focused by lens 81 through the focal point 82 to lens 83, which collimates it for reflection off the mirror 80; this light reflected from the mirror 80 is focused by the lens 83 back through the focal point 82 to the lens 81, which collimates it for reentry into the rod 10. However, the mask 84 is adapted to absorb or otherwise dissipate light striking its surface, so that only light directed by the lens 81 through the aperture 85 can pass back and forth in the cavity in the above described manner. In other words, the mask 84 is similar in effect to the mask 41 of the embodiment of FIG. 5; thus with the aperture 85 dimensioned to be smaller by a selected amount than the image formed by the lens 81 at the focal point 82, bidirectional reflection of light in the cavity is limited predominantly to light in selected modes of propagation, as in the structure of FIG. 5 described above.

With the embodiment of FIG. 8, Q switching is effected by rotation of the mirror 80 about an axis that is perpendicular to the axis of the laser cavity, as disclosed, for example, in my copending application, Ser. No. 212,910, filed July 27, 1962, entitled "Laser Structure," and assigned to the same assignee as the present application. Except when the mirror is within a few seconds of arc of parallelism with the end face 11 of the laser rod, the mirror reflects light back in such direction that it is focused by the lens 83 outside the aperture 85 of the mask 84, and hence there is no bidirectional reflection of light but a low Q condition for all modes in the cavity-providing structure. When, however, the mirror approaches parallelism with the end face 11, it reflects light (collimated by the lens 83) back through the lens 83 and the focal point 82 coincident with the aperture 85; the cavity is thus switched to a high Q condition, and bidirectional reflection of light in the selected modes can hence build up between the mirror 80 and rod end face 11 through the focal point 82 to provide an output light pulse.

For such rotation, the mirror 80 is conveniently mounted on a shaft 87 driven by a suitable motor 88, as shown in FIG. 9. Rotation of the mirror is synchronized with the initiation of the pumping light pulse in the flash tube. By way of example, such synchronization may as shown in FIG. 9 be provided by a contact plate 89 mounted on the shaft 87 in appropriate angular relation to the mirror 80, and contact points 90, 91 arranged to come simultaneously into contact with the plate 89 when the latter is carried by rotation of the shaft 87 into position for such contact. As in the similar arrangement of synchronization elements shown and described above in connection with the embodiment of FIG. 1, the contact points 90, 91 are respectively connected to the control instrumentality 18 through leads 92, 94, and a manually operable push switch 95 is connected in series with the points 90, 91. When the switch 95 is closed, contact of the points 90, 91 with the plate 89 closes a circuit actuating the control instrumentality 18 to energize the trigger circuit 17 and thereby to initiate the pumping light pulse from the flash tube. Thus, by properly selecting the relative angular positions of the plate 89 and the mirror 80 on the shaft 87, and the angular velocity at which the motor 88 drives the shaft, the mirror 80 will be out of the aforementioned high Q-providing near-parallel relation to the rod end face 11 when the pumping light pulse is initiated and will be carried by rotation of the shaft into such high Q-providing position at a predetermined time after initiation of the pumping light pulse, switching the cavity-providing structure from low Q to high Q condition at this preselected moment in the pumping period.

In operation, with the motor 88 driving the shaft 87 at a predetermined angular velocity and the requisite charge energy developed in the flash tube power source, the switch 95 is closed. Consequently, the first time thereafter that the plate 89 is carried by rotation of the shaft into contact with the points 90, 91, the circuit of points 90, 91 is closed, actuating the control instrumentality 18 to energize the trigger circuit 17 and thereby to initiate a pumping light pulse from the flash tube. At this time the cavity-providing structure is in low Q condition because of the above-described angular relation of the mirror 80 and plate 89. The continuing rotation of the shaft carries the mirror into the aforementioned near-parallelism with the rod end face 11, switching the cavity-providing structure from the low Q condition previously obtaining to a high Q condition, at a predetermined finite time after initiation of the pumping light pulse, and specifically after the inversion of energy states in the rod has reached a maximum value. Bidirectional reflection of light in the selected modes can then occur in the cavity through the aperture 85 at the focal point 82, producing an output light pulse of desirably high peak power (because of the Q switching operation) and narrow beam spread and high power per unit solid angle (because of the mode selection in the cavity). This pulse is terminated as the continuing rotation of the mirror carries it out of parallelism with the end face 11. As therefore appears, the operation of this embodiment is essentially similar to that of the embodiments previously described, except that Q switching is in this instance provided by rotation of the mirror 80 successively into, through, and out of reflective alignment with the laser cavity rather than by occlusion of the laser cavity at a focal point therein with a shutter structure.

The shutters and aperture-defining mask structures included in the several embodiments set forth above may be made of a suitable opaque light-absorbing material, such as a metal having a non-reflective surface or coating. However, especially in the case of extended laser operation, when such structures and particularly the portions adjacent the apertures occlude any significant amount of light over a prolonged period, the energy thus absorbed may cause melting or other deformation of the aperture-defining edges with concomitant undesirable alteration in optical properties of the laser cavity. Consequently, the aforementioned structures may be provided by glass or like transparent structures adapted either to reflect the unwanted light out of the laser cavity or to refract it out of the cavity, as disclosed in the copending application of Charles J. Koester and Edgar O. Dixon, Serial No. 212,909, filed July 27, 1962, entitled "Laser Structure" and assigned to the same assignee as the present application.

It is to be understood that the invention is not limited to the features and embodiments herein specifically shown and set forth, but may be carried out in other ways without departure from its spirit.

I claim:

1. A laser structure comprising a laser component providing a segment of a wave-energy progagation path, means for energizing said component to establish a laserable inversion of energy states thereof, wave-energy reflective means passively terminating a first end of said propagation path, means for focusing wave energy through an incremental cross-sectional area of the path, and means including means reflectively terminating the second end of said propagation path with respect to said focused energy for mode selectively switching the Q of said path to control the value of the Q of said path for selected modes of propagation therein.

2. A laser structure comprising a laser component providing a segment of a wave-energy propagation path, means for energizing said component to establish a laserable inversion of energy states thereof, wave-energy reflective means passively terminating a first end of said propagation path, means for focusing through an incremental cross-sectional area of the path wave energy emitted by said component in selected modes of propagation, and means including means reflectively terminating the second end of said propagation path with respect to said focused energy for mode selectively switching the Q of said path to control the value of the Q of said path for said selected modes of propagation.

3. A laser structure comprising a laser component providing a segment of a wave-energy propagation path, means for energizing said component to establish a laserable inversion of energy states thereof, wave-energy reflective means passively terminating a first end of said propagation path, means for focusing wave energy through an incremental cross-sectional area of the path, and means including means reflectively terminating the second end of said propagation path with respect to said focused energy for mode selectively switching the Q of said path in synchronization with said energizing means to increase the Q of said path for selected modes of propagation therein at a predetermined finite time after initiation of energization of said laser component by said energizing means.

4. A laser structure comprising a laser component providing a segment of a wave-energy propagation path, means for energizing said component to establish a laserable inversion of energy states thereof, wave-energy reflective means passively terminating a first end of said propagation path, means for focusing through an incremental cross-sectional area of the path wave energy emitted by said component in selected modes of propagation, and means including means reflectively terminating the second end of said propagation path with respect to said focused energy for mode selectively switching the Q of said path in synchronization with said energizing means set to increase the Q of said path for said selected modes of propagation at a predetermined finite time after initiation of energization of said laser component by said energizing means.

5. A laser structure comprising a laser component providing a segment of a wave-energy propagation path, means for energizing said component to establish a laserable inversion of energy states thereof, wave-energy reflective means passively terminating a first end of said propagation path, means for focusing through an incremental cross-sectional area of the path wave energy emitted by said component in selected modes of propagation, and mode selective Q switching means operating in synchronized relation with said energizing means and adapted to terminate the second end of said propagation path non-reflectively for a predetermined finite time after initiation of energization of said laser component by said energizing means and to terminate said second end of said path reflectively for said selected modes of propagation at said predetermined finite time.

6. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means for reflectively terminating the second end of said path adapted to focus bidirectionally through a focal point in said path wave energy emitted by said component in selected modes of propagation, and means operating in synchronized relation with said energizing means and adapted to increase the Q of said path for said selected modes of propagation at a predetermined finite time after initiation of energization of said laser component by said energizing means.

7. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means for reflectively terminating the second end of said path and lens means disposed in said path intermediate said laser component and said second wave-energy reflective means for bidirectionally focusing through an axial focal point in said path intermediate said lens means and said second wave-energy reflective means wave energy emitted by said component in selected modes of propagation, and means operating in synchronized relation with said energizing means and adapted to prevent reflective termination of said second end of said path by said second wave-energy reflective means for a predetermined finite time after initiation of energization of said laser component by said energizing means and to effect reflective termination of said second end of said path with respect to said focused energy by said second wave-energy reflective means for an interval of predetermined length commencing at said predetermined finite time.

8. A laser structure comprising a laser component providing a segment of a wave-energy propagation path, means for energizing said component to establish a laserable inversion of energy states thereof, first wave-energy reflective means passively terminating a first end of said propagation path, means for focusing through an incremental cross-sectional area of the path wave energy emitted by said component in selected modes of propagation, second wave-energy reflective means passively terminating a second end of said path reflectively for said selected modes of propagation, and means for mode selectively switching the Q of said path in synchronization with said energizing means to increase the Q of said path for said selected modes of propagation at a predetermined finite time after initiation of energization of said laser component by said energizing means.

9. A laser structure comprising a laser component providing a segment of a wave-energy propagation path, means for energizing said component to establish a laserable inversion of energy states thereof, first wave-energy reflective means passively terminating a first end of said propagation path, means including second wave-energy reflective means passively terminating a second end of said path for bidirectionally focusing through a focal point in the path wave energy emitted by said component in selected modes of propagation, and means operating in synchronized relation with said energizing means and adapted to prevent passage of wave energy through said focal point for a predetermined finite time after initiation of energization of said laser component by said energizing means, and to permit bidirectional passage of wave energy in said selected modes through said focal point for an interval of predetermined length commencing at said predetermined time.

10. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means passively terminating the second end of said path and lens means disposed in said path intermediate said laser component and said second wave-energy reflective means for bidirectionally focusing through a focal point in said path intermediate said lens means and said second wave-energy reflective means wave energy emitted by said component in selected modes of propagation, and means operating in synchronized relation with said energizing means and adapted to occlude said focal point for a predetermined finite time after initiation of energization of said laser component by said energizing means and to permit bidirectional passage of wave energy in said selected modes of propagation through said focal point at said predetermined finite time.

11. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means passively terminating the second end of said path and lens means disposed in said path intermediate said laser component and said second wave-energy reflective means for bidirectionally focusing through an axial focal point in said path intermediate said lens means and said second wave-energy reflective means wave energy emitted by said component in selected modes of propagation, shutter means including a wave-energy dissipating surface disposed and adapted to undergo displacement into and out of position occluding said focal point, and means for displacing said surface in synchronization with said energizing means to carry said surface out of said occluding position at a predetermined finite time after initiation of energization of said laser component by said energizing means and thereby to permit bidirectional passage of wave-energy in said selected modes of propagation through said focal point at said predetermined finite time.

12. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means passively terminating the second end of said path and lens means disposed in said path intermediate said laser component and said second wave-energy reflective means for bidirectionally focusing through a focal point in said path intermediate said lens means and said second wave-energy reflective means wave energy emitted by said component in selected modes of propagation, means including a shutter having an opaque non-reflective surface and a portion defining an opening in said surface, disposed and adapted to undergo displacement in a plane perpendicular to the axis of said path at said focal point into and out of position wherein said opening intersects said focal point to permit bidirectional passage of wave energy in said selected modes of propagation through said focal point, and to occlude said focal point continuously when out of said position, and controllable means for effecting said displacement of said shutter to carry said shutter selectively into and out of said position.

13. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means passively terminating the second end of said path and lens means disposed in said path intermediate said laser component and said second wave-energy reflective means for bidirectionally focussing through an axial focal point in said path intermediate said lens means and said second wave-energy reflective means wave-energy emitted by said component in selected modes of propagation, means including a shutter, having an opaque non-reflective surface and a portion defining an opening in said surface, disposed and adapted to undergo displacement in a plane perpendicular to the axis of said path at said focal point into and out of a position wherein said opening intersects said focal point to permit bidirectional passage of wave energy in said selected modes of propagation therethrough and to occlude said focal point continuously when out of said position, and means for effecting said displacement of said shutter in synchronization with said energizing means to carry said shutter successively into and out of said position at a predetermined finite time after initiation of energization of said laser component by said energizing means to permit said bidirectional passage of wave energy through said focal point as aforesaid for an interval of predetermined length commencing at said predetermined finite time.

14. A laser structure comprising a laser component providing a segment of a wave-energy propagation path, means for energizing said component to establish a laserable inversion of energy states thereof, wave-energy reflective means passively terminating a first end of said propagation path, means, including lens means disposed in said path intermediate said laser component and the second end of said path and a wave-energy reflective surface disposed and adapted to undergo angular displacement about an axis perpendicular to the axis of said path into and out of position reflectively terminating the second end of said path, for bidirectionally focusing through an axial focal point in said path intermediate said lens means and the second end of said path wave energy emitted by said component in selected modes of propagation, and means for effecting said angular displacement of said surface in synchronization with said energizing means to carry said surface into said position at a predetermined finite time after initiation of energization of said laser component by said energizing means, and thereby to permit bidirectional passage of wave energy in said selected modes of propagation in said path at said predetermined finite time.

15. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means terminating a second end of said propagation path and lens means disposed in said path intermediate said laser component and said second wave-energy reflective means for bidirectionally focusing wave energy through a focal point in said path intermediate said lens means and said second wave-energy reflective means, and mask means intersecting said path at said focal point and having an aperture positioned to coincide with said focal point, said mask means, said lens means and said second wave-energy reflective means being mutually arranged and adapted to restrict bidirectional passage of wave energy in said path to wave energy emitted by said component in selected modes of propagation.

16. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means terminating a second end of said propagation path and lens means disposed in said path intermediate said laser component and said second wave-energy reflective means for bidirectionally focusing wave energy through a focal point in said path intermediate said lens means and said second wave-energy reflective means, and mask means intersecting said path at said focal point and having a circular aperture, positioned to coincide with said focal point, of aperture size selected to occlude wave energy other than that passing through the focal point, said mask means, said lens means and said second wave-energy reflective means being mutually arranged and adapted to restrict bidirectional passage of wave energy in said path to wave energy emitted by said component in selected modes of propagation.

17. A laser structure comprising a laser component providing a segment of a wave-energy propagation path, means for energizing said component to establish a laserable inversion of energy states thereof, wave-energy reflective means passively terminating a first end of said propagation path, means including second wave energy reflective means terminating a second end of said propagation path and lens means disposed in said path intermediate said laser component and said second wave-energy reflective means for bidirectionally focusing wave energy through a focal point in said path intermediate said lens means and said second wave-energy reflective means, mask means intersecting said path at said focal point and having an aperture positioned to coincide with said focal point, said mask means, said lens means and said second wave-energy reflective means being mutually arranged and adapted to restrict bidirectional passage of wave energy in said path to wave energy emitted by said component in selected modes of propagation, and means for switching the Q of said path to control the value of the Q of said path for said selected modes of propagation.

18. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means terminating a second end of said propagation path and lens means disposed in said path intermediate said laser component and said second wave-energy reflective means for bidirectionally focusing wave energy through a focal point in said path intermediate said lens means and said second wave-energy reflective means, mask means intersecting said path at said focal point and having an aperture positioned to coincide with said focal point, said mask means, said lens means and said second wave-energy reflective means being mutually arranged and adapted to restrict bidirectional passage of wave energy in said path to wave energy emitted by said component in selected modes of propagation, and means for displacing said mask means to carry said aperture selectively into and out of position coinciding with said focal point in synchronization with said energizing means adapted to carry said aperture into said position at a predetermined finite time after initiation of energization of said laser component by said energizing means and thereby to increase the Q of said path for said selected modes of propagation at said predetermined time.

19. A laser structure comprising a laser component providing a segment of a wave-energy propagation path, means for energizing said component to establish a laserable inversion of energy states thereof, wave-energy reflective means passively terminating a first end of said propagation path, means including second wave-energy reflective means terminating a second end of said propagation path and lens means disposed in said path intermediate said laser component and said second wave-energy reflective means for bidirectionally focusing wave energy through a focal point in said path intermediate said lens means and said second wave-energy reflective means, mask means intersecting said path at said focal point and having an aperture positioned to coincide with said focal point, said mask means, said lens means and said second wave-energy reflective means being mutually arranged and adapted to restrict bidirectional passage of wave energy in said path to wave energy emitted by said component in selected modes of propagation, and means for effecting angular displacement of said second wave-energy reflective means, about an axis perpendicular to the axis of said path, into and out of position reflectively terminating said second end of said path in synchronization with said energizing means, adapted to carry said second wave-energy reflective means into said position at a predetermined finite time after initiation of energization of said laser component by said energizing means and thereby to increase the Q of said path for said selected modes of propagation at said predetermined time.

20. A laser structure comprising a laser component providing a segment of a wave-energy propagation path; means for energizing said component to establish a laserable inversion of energy states thereof; wave-energy reflective means passively terminating each end of said propagation path; means including a pair of positive lenses disposed in fixed spaced relation in said path intermediate said component and one of said wave-energy reflective means to provide two intermediate focal points in said path; mask means intersecting a first of said focal points in said path and having an aperture positioned to coincide with said first focal point, said mask means, said pair of lenses, and said last-mentioned wave-energy reflective means being mutually arranged and adapted to restrict bidirectional passage of wave energy in said path to wave energy emitted by said component in selected modes or propagation; shutter means having an opening, disposed and adapted to intersect the second of said focal points in said path and to undergo displacement into and out of a position in which said opening coincides with said second focal point and to occlude said second focal point continuously when out of said position; and means for displacing said shutter means into and out of said position to control the value of the Q of said path for said selected modes of propagation.

21. A laser structure comprising a laser component providing a segment of a wave-energy propagation path; means for energizing said component to establish a laserable inversion of energy states thereof; wave-energy reflective means passively terminating a first end of said propagation path; means, including second wave-energy reflective means passively terminating a second end of said propagation path and a pair of positive lenses disposed in fixed spaced relation in said path intermediate said component and said second wave-energy reflective means, providing a first focal point in said path intermediate said lenses and a second focal point in said path intermediate said pair of lenses and said second wave-energy reflective means; mask means intersecting said first focal point in said path and having an aperture positioned to coincide with said first focal point, said mask means, said pair of lenses, and said second wave-energy reflective means being mutually arranged and adapted to restrict bidirectional passage of wave energy in said path to wave energy emitted by said component in selected modes of propagation; shutter means having an opening, disposed and adapted to intersect said second focal point in said path and to undergo displacement into and out of a position in which said opening coincides with said second focal point and to occlude said second focal point continuously when out of said position; and means for displacing said shutter means into and out of said position in synchronization with said energizing means to carry said shutter means into said position at a predetermined finite time after initiation of energization of said laser component by said energizing means and thereby to increase the Q of said path for said selected modes of propagation at said predetermined time.

22. A laser structure comprising a laser component providing a segment of a wave-energy propagation path; means for energizing said component to establish a laserable inversion of energy states thereof; wave-energy reflective means passively terminating each end of said propagation path; means including a pair of positive lenses disposed in fixed spaced relation in said path intermediate said component and one of said wave-energy reflective means to provide two intermediate focal points in said path; mask means intersecting a first of said focal points in said path and having a slit positioned to coincide with said first focal point, said mask means, said pair of lenses, and said last-mentioned wave-energy reflective means being mutually arranged and adapted to restrict bidirectional passage of wave energy in said path to wave energy emitted by said component in selected modes of propagation; shutter means having a slit, disposed and adapted to intersect the second of said focal points in said path and to undergo displacement into and out of a position in which said shutter slit coincides with said second focal point with the side edges of said shutter slit respectively parallel to the side edges of said slit of said mask means, and to occlude said second focal point continuously when out of said position; and means for displacing said shutter means into and out of said position in synchronization with said energizing means to carry said shutter means into said position at a predetermined finite time after the initiation of energization of said laser component by said energizing means and thereby to increase the Q of said path for said selected modes of propagation at said predetermined time.

23. A laser structure comprising a laser component providing a segment of a wave-energy propagation path; means for energizing said component to establish a laserable inversion of energy states thereof; wave-energy reflective means passively terminating each end of said propagation path; means including a pair of positive lenses disposed in fixed spaced relation in said path intermediate said component and one of said wave-energy reflective means to provide two intermediate focal points in said path; mask means intersecting a first of said focal points in said path and having an aperture positioned to coincide with said first focal point, said mask means, said pair of lenses, and said last-mentioned wave-energy reflective means being mutually arranged and adapted to restrict bidirectional passage of wave energy in said path to wave energy emitted by said component in selected modes of propagation; shutter means having a plurality of openings, disposed and adapted to intersect the second of said focal points in said path and to undergo displacement through a range of positions in which said openings successively coincide with said second focal point; and means for effecting said displacement of said shutter.

24. A laser structure comprising a laser component providing a segment of a wave-energy propagation path; means for energizing said component to establish a laserable inversion of energy states thereof; wave-energy reflective means passively terminating each end of said propagation path; means including a pair of positive lenses disposed in fixed spaced relation in said path intermediate said component and one of said wave-energy reflective means to provide two intermediate focal points in said path; mask means intersecting a first of said focal points in said path and having a region defining a plurality of randomly spaced slits within a cross-sectional area smaller than the cross-sectional area of said path at said first focal point and positioned to coincide with said first focal point; shutter means having a plurality of randomly spaced slits identical in configuration and arrangement with said randomly spaced slits of said mask means, disposed and adapted to intersect the second of said focal points in said path and to undergo displacement into and out of a position in which said randomly spaced slits of said shutter means coincide with said second focal point and are simultaneously conjugate with said randomly spaced slits of said mask means; and means for displacing said shutter means into and out of said position in synchronization with said energizing means to carry said shutter means into said position at a predetermined finite time after initiation of energization of said laser component by said energizing means and thereby to increase the Q of said path at said predetermined finite time.

References Cited by the Examiner

UNITED STATES PATENTS

| | | | |
|---|---|---|---|
| 2,929,922 | 3/1960 | Schawlow et al. | 88—1 |
| 3,055,257 | 9/1962 | Boyd et al. | 88—1 |

OTHER REFERENCES

Bell article, "Optical Maser Symposium at Bell Laboratories," Bell Laboratories Record, vol. 39, November 1961, page 395.

Bushor: "Sun and Exploding Wires Pump Lasers," Electronics, vol. 35, No. 13, March 30, 1962, pp. 24 and 25, page 25 relied upon.

Collins et al.: "Control of Population Inversion in Pulsed Optical Masers by Feedback Modulation," Journal of Applied Physics, vol. 33, No. 6, June 1962, pages 2009–2011.

Hellwarth: "Control of Fluorescent Pulsations," Advances in Quantum Electronics, J. R. Singer, Ed., Columbia University Press, New York, 1961, pages 334–341.

JEWELL H. PEDERSEN, *Primary Examiner*.

DAVID H. RUBIN, *Examiner*.

R. L. WIBERT, *Assistant Examiner*.